United States Patent [19]

Ai et al.

[11] 4,447,580
[45] May 8, 1984

[54] RESIN COMPOSITION, COATING MATERIAL COMPRISING SAID RESIN COMPOSITION AND METHOD FOR FORMING COATINGS

[75] Inventors: Hideo Ai; Naohiro Tsuruta, both of Fuji, Japan

[73] Assignee: Asahi Kasei Kogyo Kabushiki Kaisha, Osaka, Japan

[21] Appl. No.: 320,801

[22] Filed: Nov. 12, 1981

[30] Foreign Application Priority Data

Nov. 17, 1980 [JP] Japan .................................. 55-160842

[51] Int. Cl.³ ..................... C08F 299/04; C08L 27/04; C08L 63/10
[52] U.S. Cl. .................................... 525/121; 525/208; 525/217; 525/214; 525/221; 525/920; 525/921; 525/922; 525/925; 525/57; 525/122; 525/125; 525/177; 525/178; 525/184; 525/187; 524/517; 524/521
[58] Field of Search ............... 525/208, 217, 221, 214, 525/922, 920, 921, 925, 121, 177, 57, 125, 122, 178, 184, 187; 524/517, 521

[56] References Cited

U.S. PATENT DOCUMENTS 3,969,300 7/1976 Nagata et al. ........................ 525/922
3,975,251 8/1976 McGinniss ........................ 204/181 R

OTHER PUBLICATIONS

E. H. Riddle, Monomeric Acrylic Esters, pub. by Reinhold, 1955.

*Primary Examiner*—John C. Bleutge
*Assistant Examiner*—Robert E. L. Sellers
*Attorney, Agent, or Firm*—Sprung, Horn, Kramer & Woods

[57] ABSTRACT

A resin composition comprising (A) a polymer having, in the molecule, at least two groups represented by the following structural formula (I):

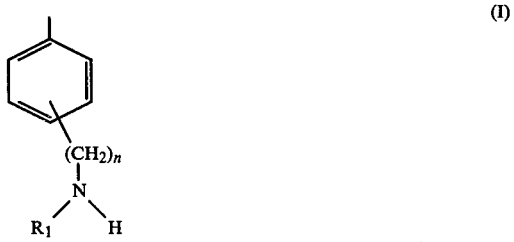

(I)

wherein $R_1$ is isopropyl, sec-butyl, tert-butyl, a $C_{5-20}$ alkyl group, a $C_{3-20}$ cycloalkyl group, a $C_{5-20}$ alkenyl group, a $C_{3-20}$ hydroxyalkyl group, a $C_{5-20}$ alkoxyalkyl group, a $C_{3-20}$ aminoalkyl group, a $C_{6-20}$ aryl group or a $C_{6-20}$ arylalkyl group, and n is 0, 1 or 2, and (B) a polymer having an electron attractive group and an $\alpha,\beta$-ethylenic double bond adjacent thereto. Though said composition is stable at room temperature, it is crosslinked and cured at high temperatures because the amino group of the polymer (A) adds to the double bond of the polymer (B). Accordingly, said resin composition is suitable for use as a cathodic electrocoating material.

22 Claims, No Drawings

RESIN COMPOSITION, COATING MATERIAL COMPRISING SAID RESIN COMPOSITION AND METHOD FOR FORMING COATINGS

This invention relates to a novel resin composition useful as coating material, adhesive and the like which is crosslinkable and curable by the Michael addition reaction.

The object of this invention is to provide a novel resin composition which is excellent in pot life and storage stability at room temperature and rapidly reacts at high temperatures to form a sufficiently crosslinked structure which exhibits excellent mechanical characteristics, chemical resistance, bonding strength, etc.

Hitherto, as a method for heat-curing a polymer composition to form a crosslinked structure, there has been known a method by which, for example, a polymer having double bonds is subjected to a radical reaction using heat, light, a radiation, a radical initiator or the like to cure the polymer. Though such a method has hitherto been utilized industrially, it has the fault that the radical reaction is inhibited particularly in the presence of oxygen and, in the case of a coating material such as paint, ink or the like, the reaction becomes slower as the film thickness increases, so that its industrial use is restricted in various respects.

Further, as a material which is stable at room temperature and cures upon heating, there is known a combination of a blocked isocyanate compound and an active hydrogen compound. Though this combination has the characteristic feature that it is stable at room temperature, the addition of a tin compound or the like is necessary for accelerating the curing at high temperatures. Furthermore, it has the fault that the blocking agent dissociates upon curing to form a void in the cured product or to emit an unpleasant odor.

Moreover, there is known a combination of a polymer or a compound having an electron attractive group and an $\alpha,\beta$-ethylenic double bond adjacent thereto with a polymer or a compound having active hydrogen (they are cured by the so-called Michael addition reaction). Though this combination is crosslinked and cured by the Michael addition reaction upon heating to give a cured product having excellent characteristics, it is so instable as to undergo reaction even at room temperature and therefore it is limited in practical use. For this reason, various methods have been proposed in order to prevent the reaction at room temperature. For example, a cathodic electrodeposition resin composition comprising a polyacrylate resin and an acid-solubilized polyamine resin is disclosed in U.S. Pat. No. 3,975,251. In this case, however, in order to prevent the Michael addition reaction at room temperature, said polyamine resin is neutralized completely (namely, 100% or more of the theoretical degree of neutralization) so that the reaction between the polyamine resin not deprotonated and the polyacrylate resin at room temperature cannot take place in the electrocoating bath. However, due to the high degree of neutralization, this method has the fault that the electrocoating bath is corroded owing to the low pH in the system and the characteristics of electrodeposition such as coulomb efficiency, etc. are deteriorated.

In order to eliminate these faults, U.S. Pat. No. 4,198,331 discloses a curable resin composition which comprises a polyamine resin having a primary amino group and/or a secondary amino group and being stable under the curing conditions and a carbonyl-conjugated $\alpha,\beta$-ethylenically unsaturated compound which is blocked with a primary amine and/or a secondary amine and is unstable under the curing conditions. This method can solve the problems concerning stability at room temperature, corrosion of apparatus and electrodeposition characteristics. Since an amine compound is, however, used as a blocking agent, this dissociates upon heat-curing to cause problems of toxicity and formation of resinous substance or soot.

In view of the above, the present inventors have conducted extensive studies to find that a novel resin composition which is stable at room temperature but crosslinkable and curable upon heating can be obtained by combining two or more specific polymers, and the above-mentioned problems can be solved by this resin composition.

According to this invention, there is provided a resin composition comprising (A) a polymer having at least two groups represented by the following structural formula (I) in its molecule and (B) a polymer having an electron attractive group and an $\alpha,\beta$-ethylenic double bond adjacent thereto, said resin composition being stable at room temperature but crosslinked and cured at high temperatures by the Michael addition reaction, and also provided a coating material comprising said resin composition and a method for forming a coating:

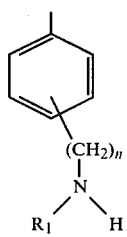

(I)

wherein $R_1$ is a group selected from the class consisting of isopropyl, sec-butyl, tert-butyl, a $C_{5\text{-}20}$ alkyl group, a $C_{3\text{-}20}$ cycloalkyl group, a $C_{5\text{-}20}$ alkenyl group, a $C_{3\text{-}20}$ hydroxyalkyl group, a $C_{5\text{-}20}$ alkoxyalkyl group, a $C_{3\text{-}20}$ aminoalkyl group, a $C_{6\text{-}20}$ aryl group and a $C_{6\text{-}20}$ arylalkyl group, and n represents 0, 1 or 2.

The term "high temperature" used herein means 100° C. or higher and preferably the range of 120° C. to 200° C.

The electron attractive group which the polymer (B) has is a functional group such as carbonyl, carboxyl, nitrile, nitro, or the like.

Various combinations are possible between the polymer (A) and the polymer (B), one of the typical examples of which is a combination between (A) a polymer having at least two groups represented by the formula (I), and (B) a polymer having a carbonyl group and an $\alpha,\beta$-ethylenic double bond adjacent thereto and being crosslinkable with said polymer (A).

In this invention, one or more polymers (A) may be combined with one or more polymers (B).

For carrying out the crosslinking and curing sufficiently in this invention, it is preferred that the equivalent ratio of the group represented by the formula (I) to the $\alpha,\beta$-ethylenic double bond adjacent to the electron attractive group is in the range of from 100:1 to 1:100. Particularly, for improving the mechanical characteristics, solvent resistance, corrosion resistance, etc. of the crosslinked and cured composition, the above-mentioned equivalent ratio is more preferably in the range of from 50:1 to 1:50.

In the combination of the polymer (A) and the polymer (B), substantially no curing reaction takes place at room temperature, so that the combination is excellent in storage stability. Moreover, it is a particularly excellent in that, when the resin composition is heat-cured under the given conditions, the cured products obtained therefrom have substantially the same physical properties. Further, the resin composition has the advantage that when it is used as an ink, a coating material or the like, the curing velocity is not influenced by film thickness and it is possible to keep the curing velocity and physical properties always constant.

Furthermore, the resin composition of this invention is characterized in that it is curable without being influenced by oxygen or the like, so that its industrial utilization has only a very small number of restricting conditions. Further, the resin composition of this invention generates no dissociation products upon curing and necessitates no expensive curing catalysts, so that a cured product can be obtained which is excellent in appearance, mechanical characteristics, chemical resistance, adhesive force, etc.

In the polymer (A) of this invention, $R_1$ in the formula (I) is as defined above, and includes isopropyl, sec-butyl, tert-butyl, pentyl, hexyl, heptyl, octyl, decyl, cyclopropyl, cyclobutyl, cyclohexyl, pentenyl, octenyl, hydroxyisopropyl, hydroxypentyl, hydroxyhexyl, ethoxyisopropyl, pentoxyisopropyl, heptoxyoctyl, aminoisopropyl, amino-t-butyl, aminopentyl, aminododecyl, phenyl, benzyl, naphthyl and the like, among which groups bonded to the amino group through a secondary or tertiary carbon are preferred such as isopropyl, sec-butyl, tert-butyl, cyclohexyl, benzyl, hydroxyisopropyl, and the like.

Further, when the polymer (A) has an alcoholic hydroxyl group, the effect of this invention is exhibited markedly, and hence, the presence of the alcoholic hydroxyl group is very desirable.

The polymer (A) in this invention may be any polymer having the structure of the formula (I) on the side chain or at the terminals, and its skeleton is not critical. Generally, however, vinyl polymers, vinyl copolymers, polyamides, polyesters, polyethers, polycarbonates, polyurethanes and the like may be used.

The polymer (A) can be obtained by radical polymerization, ionic polymerization, polycondensation or the like. The polymerization manner may be any conventional one such as bulk polymerization, solution polymerization, suspension polymerization, emulsion polymerization and the like. For example, the polymer (A) can be obtained by homopolymerization of a vinyl monomer represented by the following formula (II) or copolymerization of said monomer with other vinyl monomers:

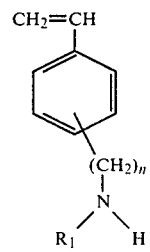

wherein $R_1$ and n are as defined above.

As the vinyl monomers represented by the formula (II), there may be mentioned N-isopropylaminoethylstyrene, N-sec-butylaminoethylstyrene, N-t-butylaminoethylstyrene, N-pentylaminoethylstyrene, N-hexylaminoethylstyrene, N-decylaminoethylstyrene, N-dodecylaminoethylstyrene, N-cyclohexylaminoethylstyrene, N-phenylaminoethylstyrene, N-benzylaminoethylstyrene, N-hydroxyisopropylaminoethylstyrene, N-methoxyhexylaminoethylstyrene, N-ethoxyisopropylaminoethylstyrene, N-aminoisopropylaminoethylstyrene, N-aminopentylaminoethylstyrene, N-isopropylaminostyrene, N-t-butylaminostyrene, N-isopropylaminomethylstyrene, N-t-butylaminomethylstyrene, N-pentylaminomethylstyrene, N-hydroxyisopropylaminomethylstyrene, N-aminobutylaminomethylstyrene, and the like.

As the monomers copolymerizable with the monomer having the formula (II), there may be used unsaturated carboxylic acids such as acrylic acid, methacrylic acid, α-chloroacrylic acid, itaconic acid, α-acyloxyacrylic acid, α-alkoxyacrylic acids, and the like; acrylic esters including alkyl acrylates such as methyl acrylate, ethyl acrylate, butyl acrylate, 2-ethylhexyl acrylate, octadecyl acrylate and the like; cycloalkyl acrylates such as cyclohexyl acrylate, trimethylcyclohexyl acrylate and the like; aryl acrylates such as phenyl acrylate, amylphenyl acrylate and the like; haloalkyl acrylates such as chloroethyl acrylate, dichloropropyl acrylate, bromopropyl acrylate and the like; hydroxyalkyl acrylates such as hydroxyethyl acrylate, bishydroxymethylpentyl acrylate and the like; alkoxyalkyl acrylates such as methoxyethyl acrylate, ethoxypropyl acrylate and the like; cyclic ether esters of acrylic acid such as glycidyl acrylate, tetrahydrofurfuryl acrylate and the like; and so on; methacrylic esters including alkyl and cycloalkyl methacrylates such as methyl methacrylate, ethyl methacrylate, butyl methacrylate, 2-ethylhexyl methacrylate, decyl methacrylate, dodecyl methacrylate, stearyl methacrylate, cyclohexyl methacrylate and the like; aryl methacrylates such as phenyl methacrylate, butylphenyl methacrylate, naphthyl methacrylate and the like; arylalkyl methacrylates such as benzyl methacrylate, triphenylmethyl methacrylate and the like; haloalkyl and halocycloalkyl methacrylates such as chloromethyl methacrylate, fluoroethyl methacrylate, bromoethyl methacrylate, chlorocyclohexyl methacrylate and the like; haloaryl methacrylates such as chlorophenyl methacrylate, tribromophenyl methacrylate and the like; hydroxyalkyl methacrylates such as hydroxyethyl methacrylate, hydroxypropyl methacrylate and the like; alkoxyalkyl methacrylates such as ethoxyethyl methacrylate, methoxybutyl methacrylate and the like; dialkylaminoalkyl acrylates such as dimethylaminoethyl methacrylate and the like; cyclic ether esters of methacrylic acid such as glycidyl methacrylate, tetrahydrofurfuryl methacrylate and the like; methoxypolyethylene glycol ester of methacrylic acid; and so on; α-chloroacrylic esters including alkyl α-chloroacrylates such as methyl α-chloroacrylate, butyl α-chloroacrylate, and the like; and alkoxyalkyl α-chloroacrylates such as ethoxyethyl α-chloroacrylate and the like; α-acyloxyacrylic esters such as alkyl α-acyloxyacrylates, for example, ethyl α-acetoxyacrylate, ethyl α-benzoyloxyacrylate and the like; α-alkoxyacrylates such as alkyl or cycloalkyl α-alkoxylacrylates, for example, cyclohexyl α-ethoxyacrylate and the like; and itaconic esters such as alkyl itaconates, for example, dimethyl itaconate, dibutyl itaconate, and the like; haloalkyl itaconates, for example, chloroethyl itaconate, and the like; and hydroxyalkyl itaconates, for example, hydroxyethyl itaconate and the like. Among them, preferable examples are acrylic acid, methyl acrylate, butyl acrylate, 2-ethylhexyl acrylate, hydroxyethyl acrylate, methacrylic acid, methyl methacrylate, butyl methacrylate, 2-ethylhexyl methacrylate, dimethylaminoethyl methacrylate, tetrahydrofurfuryl methacrylate and the like.

Further, it is also possible to add styrene, vinyl chloride, acrylonitrile, vinylidene chloride, methyl vinyl ketone, vinyl acetate or the like as said other copolymerizable component.

When said polymer (A) is produced by radical polymerization, the production can be practised by thermal polymerization or by using a radical initiator. Typical examples of said radical initiator include peroxides such as benzoyl peroxide, lauroyl peroxide and the like; azo compounds such as 2,2'-azobisisobutyronitrile, 2,2'-azobis(2,4-dimethyl)valeronitrile, 1,1'-azobiscyclohexane-1-carbonitrile and the like; hydroperoxides such as cumene hydroperoxide, t-butyl hydroperoxide and the like; and persulfates such as potassium persulfate, ammonium persulfate and the like.

The regulation of the molecular weight of the polymer can be achieved by controlling the amount of the initiator used, by selecting a suitable solvent from aromatic hydrocarbon solvents, ketone solvents and the like or by adding a chain transfer agent such as dodecylmercaptan or the like. When the amount of the initiator is increased, the molecular weight decreases. Though preferable molecular weight varies depending on the kind of polymer and cannot be defined generally, it is usually in the range of about 500 to 1,000,000 from the viewpoint of mechanical strength, chemical resistance and leveling property of a coating.

Said polymer (A) can also be obtained by reacting a homopolymer of a monomer represented by the formula (III) or a copolymer of said monomer and other vinyl monomer with a large excess of a primary amine represented by the formula (IV):

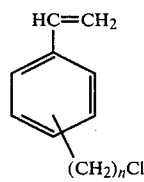
(III)

$R_1NH_2$ (IV)

wherein n is 9, 1 or 2, and $R_1$ represents a group selected from the class consisting of isopropyl, sec-butyl, t-butyl, a $C_{5-20}$ alkyl group, a $C_{3-20}$ cycloalkyl group, a $C_{5-20}$ alkenyl group, a $C_{3-20}$ hydroxyalkyl group, a $C_{5-20}$ alkoxyalkyl group, a $C_{3-20}$ aminoalkyl group, a $C_{6-20}$ aryl group and a $C_{6-20}$ arylalkyl group.

Further, the polymer (A) can also be synthesized by an ester interchange reaction between a polymer having a hydroxyl group and an ester compound having the group of the formula (I).

The polymer (B) used in this invention is not particularly limited, though polyamide resins, polyester resins, polyether resins, polyolefin resins, polyurethane resins and the like having an electron attractive group and an α,β-ethylenic double bond adjacent thereto as skeleton may preferably be used. Those having a molecular weight of 300 or more are more preferred from the viewpoint of corrosion resistance, and those having a molecular weight of about 500,000 or less are preferable from the viewpoint of leveling preparty and miscibility with other resins.

When the polymer (B) is a polymer having a carbonyl group and an α,β-ethylenic double bond adjacent thereto, it is preferable on point of stability at room temperature and curability at high temperatures. Further, when the polymer (B) is the polymer mentioned above in which the α-position of double bond is substituted by an alkyl group, its stability at room temperature is more excellent.

As is mentioned in E. H. Riddle, "Monomeric Acrylic Esters", p. 146, the Michael addition reaction of active hydrogen to α,β-ethylenic double bond is generally difficult to cause at room temperature when an alkyl group exists on the α-position. This invention is characterized in that the composition is stable at room temperature and has a sufficient curability at high temperature regardless of whether a substituent is present or absent on the α-position. That is to say, the low reactivity at low temperature is positively utilized in this invention. Accordingly, the composition of this invention has a high practical usefulness.

One example of the polymer (B) can be obtained by reacting a compound having two or more epoxy groups per one molecule with an α,β-ethylenically unsaturated carboxylic acid. In this reaction, the two components are used in a proportion that the carboxyl group of the latter exists in an amount of about one equivalent per equivalent of the epoxy group of the former. In this case, the reaction proceeds according to the following reaction scheme to give a compound having two or more α,β-unsaturated carboxyl groups at molecular ends:

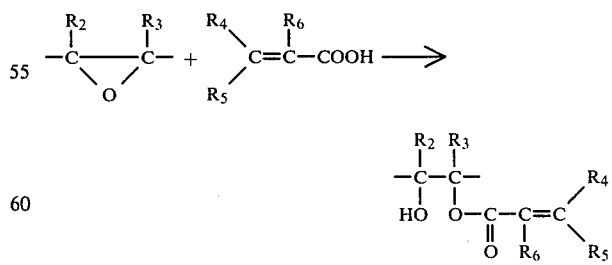

wherein $R_2$, $R_3$, $R_4$, $R_5$ and $R_6$ are hydrogen atoms or alkyl groups. In this case, a reaction product of a high degree of esterification can be obtained without gelation in the conventional manner by adding at least one polymerization inhibitor selected from monohydric phenols, polyhydric phenols and quinones and an esterifying catalyst selected from lithium halides and tertiary amines to the reaction system and heating the mixture thus obtained. It is also possible to carry out the reaction by adding, at the start of reaction or in the course of reaction, a non-reactive solvent such as an aromatic hydrocarbon (for example, benzene, toluene or the like), a ketone (for example, methyl ethyl ketone, methyl isobutyl ketone or the like), a halogenated hydrocarbon (for example, trichlorethylene, perchlorethylene or the like), fatty acid ester (for example, ethyl acetate, ethyl propionate or the like) or the like and heating the system.

Another example of the polymer (B) can be obtained by reacting a compound having an acryloyl group and/or a methacryloyl group and an isocyanate group in the molecule with a polymer having two or more hydroxyl groups in the molecule. Said compound having an acryloyl group and/or a methacryloyl group and an isocyanate group in the molecule can be obtained by reacting a hydroxyalkyl acrylate and/or a hydroxyalkyl methacrylate with an excess of a polyisocyanate such as tolylene diisocyanate, diphenylmethane diisocyanate or hexamethylene diisocyanate. As said polymer having two or more hydroxyl groups in the molecule, there may be used a homopolymer or copolymer of a hydroxyalkyl acrylate or a hydroxyalkyl methacrylate; a polyvinyl alcohol, an alkanolamine adduct of epoxy resin and the like.

As yet other examples of the polymer (B), polymers whose electron attractive group is a nitrile group, such as a polymer obtained by polymerizing 2-methyleneglutaronitrile with an organotin catalyst, or the like, can be referred to.

Further, the polymer (B) can also be obtained by an ester interchange reaction between a polymer having an ester linkage on the side chain or at the terminal and an $\alpha,\beta$-ethylenically unsaturated carboxylic acid, and can also be obtained by an esterification reaction between a polymer having a hydroxyl group in the molecule and an $\alpha,\beta$-ethylenically unsaturated carboxylic acid.

It is possible to introduce into the side chain or the terminals of the polymer (B) other functional groups capable of reacting with the polymer (A) upon heating to make a crosslinkage. In this case, if the number of the $\alpha,\beta$-ethylenic double bonds of the polymer (B), adjacent to the carbonyl group, is greater than 1, the polymer (A) and the polymer (B) can form a crosslinked structure upon heating. One example of the functional groups which may be used is a blocked isocyanate.

When the polymer (B) used in this invention has an alcoholic hydroxyl group, the effect of this invention becomes more remarkable. In addition, the effect of this invention can be made more remarkable by allowing a compound having at least one alcoholic hydroxyl group, particularly a high-boiling solvent having a boiling point of 100° C. or higher at 1 atmosphere, such as isobutyl alcohol, benzyl alcohol, propylene glycol monomethyl ehter, an ethylene glycol monoalkyl ether, a diethylene glycol monoalkyl ether, diacetone alcohol, ethylene glycol, triethylene glycol, propylene glycol or the like to coexist.

If a low-boiling solvent is used, it rapidly boils at the time of heat-curing to generate voids in the cured product and, at the same time, greatly change the storage stability and pot life of the resin composition at room temperature, so that the use thereof alone is undesirable.

The heating temperature for the crosslinking and curing of the resin composition of this invention is preferably 100° C. or higher, more preferably 120° C. or higher. If the heating temperature is lower than 100° C., the crosslinking-curing reaction is slow. If it exceeds 120° C., the crosslinking-curing reaction becomes markedly rapid.

An aqueous dispersion of the resin composition of this invention can be obtained by applying a powerful mechanical shearing force to a mixture obtained by adding water to a solution of the composition comprising the polymers (A) and (B) in a solvent or to a molten product of said composition, to cause phase inversion. In this case, the sedimentation of the aqueous dispersion of the mixture can be prevented by adding surfactant meeting with the object or use. The sedimentation of the aqueous dispersion of the resin composition of this invention can also be prevented by adding an acid such an hydrochloric acid, sulfuric acid, phosphoric acid, acetic acid, lactic acid, propionic acid or the like.

If the amount of the acid added is equal to or larger than the amount for neutralizing all the amino groups of the polymer (A), the aqueous dispersion has the characteristic feature that it is prevented from sedimentation, and hence, is markedly stable. On the other hand, the acid causes corrosion of apparatus or deteriorate electrodeposition characteristics such as coulomb efficiency and the like. Preferably, said acid is added in an amount for partially neutralizing the amino groups so that the pH of the aqueous dispersion becomes 6.5 or higher, particularly 6.5–7.5.

The heat resistance, adhesive property, etc. of the resin composition of this invention can be modified by adding thereto another compound stable at room temperature and capable of reacting with the polymer (A) and/or the polymer (B) to form a crosslinkage at high temperatures, such as an epoxy resin, a resin containing an acid anhydride, or the like. Further, it is also possible to modify the flexibility of the resin composition of this invention by adding thereto a resin inert to the polymer (A) and the polymer (B) such as a rubber, a polyolefin or the like.

To the resin composition of this invention may be added an inorganic filler such as kaolinite, clay, calcium carbonate, titanium oxide, asbestos, glass beads, glass fiber and the like, a fibrous substance, or a pigment such as carbon black or the like.

The resin composition of this invention can be used as a molding material, a fiber-treating agent, an ink, a coating material, an adhesive or the like. As a baking type coating material among the coating materials, the resin composition of this invention is quite valuable industrially and has the advantage that it can be applied by all coating processes such as brushing, spray coating, electrostatic powder coating, dip coating, cathodic electrocoating and the like.

A concrete example of the application of the resin composition to cathodic electrocoating will be mentioned below. A mixed resin composition of the polymer (A) and the polymer (B) is dissolved in ethylene glycol monoethyl ether and neutralized with an organic acid such as acetic acid. Thereafter, the resulting solution is diluted with deionized water so as to give a solid resin content of 10–20% by weight, to prepare an aqueous dispersion of the resin composition. In this aqueous dispersion, electrocoating is carried out by using a stainless steel plate as anode and a zinc phosphate-treated steel plate as cathode under the conditions of 25°–30°

C., 200–250 V and 1–5 minutes, and thereafter baking is carried out at 150°–190° C. for 5–20 minutes. Thus, a coated product having a beautiful appearance and having neither pinhole nor crater is obtained.

REFERENCE EXAMPLE 1 (PREPARATION OF MONOMER)

A 2-liter, three-necked flask purged with nitrogen and equipped with a stirring means, a thermometer and a refluxing means was disposed, into which 44 ml of purified tetrahydrofuran was introduced from a dropping funnel. With stirring, 86 ml of isopropylamine was added, and 20 ml of 2 N n-butyllithium solution was further added, upon which the color of the solution turned from colorless transparency to a light yellow color. The flask was dipped in a thermostatic chamber at 30° C., into which was added 148 ml of divinylbenzene with continuous stirring. The reaction mixture was orange, and the reaction was continued for 3 hours, after which 1 ml of methanol was added. The resulting mixture was thrown into 2 liters of water. It was twice extracted with n-hexane, and the oily layer was dried on magnesium sulfate overnight and then distilled to obtain N-isopropylaminoethylstyrene. By the same procedure as above, ethylaminoethylstyrene, n-propylaminoethylstyrene, cyclohexylaminoethylstyrene and t-butylaminoethylstyrene were also obtained.

REFERENCE EXAMPLE 2 [PREPARATION OF POLYMER (A)]

Reference Example 2-(1)

Into a 2-liter separable flask equipped with a stirrer, a thermometer and a reflux condenser were introduced 1,014 g of toluene, 102.8 g of methyl methacrylate, 17.7 g of N-isopropylaminoethylstyrene synthesized in Reference Example 1, 41.7 g of 2-ethylhexyl methacrylate and 2.5 g of 2,2'-azobisisobutyronitrile, and the resulting mixture was stirred at 80° C. for 18 hours. After completion of the reaction, the residual monomers were quantitatively analyzed by a gas chromatography to find that 11.6% by weight of the methyl methacrylate and 12.7% by weight of the 2-ethylhexyl methacrylate remained unreacted though the N-isopropylaminoethylstyrene had completely reacted. The unreacted monomers and the toluene were steam-distilled by introducing steam into the reaction mixture from a steam generator. The copolymer thus obtained was cooled, pulverized and dried.

This copolymer was a polymer having a molecular weight of about 7,000 and having, on its side chain, the group of structural formula (I) wherein $R_1$ was isopropyl and n was 2. This copolymer will be referred to as A-1, hereinafter.

Reference Example 2-(2)

Into a 3-liter separable flask were introduced 1,890 g of toluene, 103 g of methyl methacrylate, 86 g of ethyl acrylate, 28 g of t-butylaminoethylstyrene and 5 g of 2,2'-azobisisobutyronitrile, and the mixture was stirred at 75° C. for 8 hours. The reaction mixture was cooled and poured into 5 liters of n-hexane, upon which a white precipitate was formed. It was collected by filtration and the solid thus obtained was dried. It was a copolymer having a molecular weight of about 7,000 and having, on its side chain, the group of structural formula (I) wherein $R_1$ was t-butyl and n was 2. This copolymer will be referred to as A-2, hereinafter.

Reference Example 2-(3)

Into a 3-liter separable flask were introduced 1,890 g of toluene, 103 g of methyl methacrylate, 86 g of methyl acrylate, 38 g of cyclohexylaminoethylstyrene and 5 g of 2,2'-azobisisobutyronitrile, and the mixture was stirred at 75° C. for 8 hours. The reaction mixture was cooled and poured into 5 liters of n-hexane, upon which a white precipitate was formed. It was collected by filtration and the solid thus obtained was dried. It was a copolymer having a molecular weight of about 7,000 and having, on its side chain, the group of structural formula (I) wherein $R_1$ was cyclohexyl and n was 2. This copolymer will be referred to as A-3, hereinafter.

Reference Example 2-(4)

Into a 3-liter separable flask were introduced 1,890 g of toluene, 103 g of methyl methacrylate, 86 g of methyl acrylate, 48 g of N-isopropylaminoethylstyrene, 20 g of 2-hydroxyethyl acrylate and 5 g of 2,2'-azobisisobutyronitrile, and the mixture was stirred at 75° C. for 8 hours. The reaction mixture was cooled and poured into 5 liters of n-hexane. Thus, a white precipitate was formed. It was collected by filtration, and the solid thus obtained was dried. It was a polymer having a molecular weight of about 7,000, having on its side chain the group of structural formula (I) wherein $R_1$ was isopropyl and n was 2, and further having —OH group on its side chain. This copolymer will be referred to as A-4, hereinafter.

Reference Example 2-(5)

Into a 3-liter separable flask were introduced 700 g of toluene, 103 g of methyl methacrylate, 86 g of methyl acrylate, 48 g of chloromethylated styrene and 5 g of 2,2'-azobisisobutyronitrile, and the mixture was stirred at 75° C. for 8 hours. The reaction mixture was cooled and poured into 5 liters of n-hexane. Thus, a white precipitate was formed. It was collected by filtration, and the solid thus obtained was dried. In 500 g of dioxane was dissolved 100 g of this solid (polymer), and 100 g of isopropylamine was added to the resulting solution, after which the mixture was heated under reflux for 3 days. After completion of the reaction, 1,000 g of water was added to precipitate the polymer, and the latter was collected by filtration and dried to obtain a solid. By infrared absorption spectrometry, it was confirmed that this solid (copolymer) had secondary amino group. This was a copolymer having a molecular weight of about 30,000 and having, on its side chain, the group of structural formula (I) wherein $R_1$ was isopropyl and n was 1. Hereinafter, this copolymer will be referred to as A-5.

Reference Example 2-(6)

Into a 3-liter separable flask were introduced 1,890 g of toluene, 103 g of methyl methacrylate, 95 g of butyl acrylate, 48 g of chlorostyrene and 5 g of 2,2'-azobisisobutyronitrile, and the mixture thus obtained was stirred at 75° C. for 8 hours. The reaction mixture was cooled and poured into 5 liters of n-hexane, upon which a white precipitate was formed. It was collected by filtration, and the solid thus obtained was vacuum-dried. In 1,000 g of dioxane was dissolved 200 g of this solid (polymer), and 200 g of isopropylamine was added to the resulting solution in the presence of cuprous chloride, after which the resulting mixture was heated under reflux for 24 hours. (Literature reference: T. KAMIYAMA, et al., Yuki Gosei Kagaku (Organic Synthetic Chemistry), Vol. 36, No. 9 (1978), pp. 784–788).

After completion of the reaction, the reaction mixture was poured into 2,000 g of n-hexane, the supernatant was removed, and the white precipitate thus obtained was vacuum-dried. It was confirmed by an infrared absorption spectrometry that this copolymer had secondary amino group.

This copolymer was a polymer having a molecular weight of about 7,000 and having, on its side chain, the group of the structural formula (I) wherein $R_1$ was isopropyl, and n was 0.

Hereinafter, this copolymer will be referred to as A-6.

REFERENCE EXAMPLE 3 [PREPARATION OF POLYMER (B)]

Reference Example 3-(1)

In 3 parts by weight of methyl ethyl ketone were dissolved 142 parts by weight of glycidyl methacrylate, 100 parts by weight of methyl methacrylate and 142 parts by weight of butyl acrylate. To the resulting solution was added 2 parts by weight of azobisisobutyronitrile, and the mixture was polymerized at 80° C. for 8 hours. After completion of the polymerization, 26 parts by weight of methacrylic acid, 1 part by weight of hydroquinone and 1 part by weight of dimethylbenzylamine was added to the resulting polymer solution, and the mixture was reacted at 100° C. for 5 hours. After completion of the reaction, the methyl ethyl ketone was removed to obtain a copolymer having ethylenic double bond. This was a copolymer having an $\alpha,\beta$-ethylenic double bond on the side chain and a methyl group at the $\alpha$-position.

Hereinafter, this copolymer will be referred to as B-1.

Reference Example 3-(2)

In 300 parts by weight of N-methylpyrrolidone were dissolved 930 parts by weight of a Bisphenol A type epoxy resin having an epoxy equivalent of 465 (trade name AER-661, manufactured by Asahi Kasei Kogyo K.K.). The resulting solution was heated to 100° C. while dropping a solution of 1 part by weight of hydroquinone and 1 part by weight of dimethylbenzylamine in 144 parts by weight of acrylic acid thereinto, and it was reacted at that temperature for 5 hours. After completion of the reaction, the N-methylpyrrolidone was removed to obtain a solid copolymer.

It was a copolymer having a molecular weight of about 10,000 and having $\alpha,\beta$-ethylenic double bonds at both molecular ends without any alkyl group at the $\alpha$-position.

Hereinafter, this copolymer will be referred to as B-2.

Reference Example 3-(3)

In 300 parts by weight of N-methylpyrrolidone were dissolved 950 parts by weight of a Bisphenol A type epoxy resin having an epoxy equivalent of 950 (trade name AER-664, manufactured by Asahi Kasei K.K.). The resulting solution was heated to 100° C. while dropping a solution of 1 part by weight of hydroquinone and 1 part by weight of dimethylbenzylamine in 86 parts by weight of methacrylic acid thereinto, and it was reacted at that temperature for 5 hours. After completion of the reaction, the N-methylpyrrolidone was removed to obtain a solid copolymer. It was a copolymer having a molecular weight of about 2,000 and having $\alpha,\beta$-ethylenic double bonds with methyl group at the $\alpha$-position.

Hereinafter, this copolymer will be referred to as B-3.

Reference Example 3-(4)

At a temperature of 50° C. or less, 71 parts by weight of 2-ethylhexanol containing a small quantity of dibutyltin laurate was portionwise added over a period of 2 hours to 37.1 parts by weight of 2,4- and 2,6-toluenediisocyanate (80/20) to prepare monourethane of 2,4- and 2,6-toluenediisocyanate (80/20). While dropping 152 parts by weight thereof into 950 parts by weight of a solution (solid content 50% by weight) of a Bisphenol A type epoxy resin having an epoxy equivalent of 950 (trade name AER-664, manufactured by Asahi Kasei Kogyo K.K.) in methyl ethyl ketone, the resulting mixture was reacted at 80° C. for 5 hours. After completion of the reaction, 36 parts by weight of acrylic acid, 1 part by weight of hydroquinone and 1 part by weight of dimethylbenzylamine were added, and the resulting mixture was reacted at 100° C. for 5 hours. After completion of the reaction, the methyl ethyl ketone was removed to obtain a copolymer. It was a copolymer having a molecular weight of about 2,000, having a blocked isocyanate group on its side chain and having $\alpha,\beta$-ethylenic double bonds at both molecular ends.

Hereinafter, this copolymer will be referred to as B-4.

Reference Example 3-(5)

In 300 parts by weight of N-methylpyrrolidone was dissolved 1,000 parts by weight of a liquid polybutadiene having an epoxy equivalent of 500 (trade name Poly bd R-45 EPI, manufactured by Idemitsu Sekiyu Kagaku K.K.). The resulting solution was heated to 100° C. while dropping a solution of 1 part by weight of hydroquinone and 1 part by weight of dimethylbenzylamine in 144 parts by weight of acrylic acid thereinto, and it was reacted at that temperature for 5 hours. After completion of the reaction, the N-methylpyrrolidone was removed to obtain a polymer.

Hereinafter, this polymer will be referred to as B-5.

Reference Example 3-(6)

One part by weight of benzoyl peroxide was added to a mixture of 116 parts by weight of 2-hydroxyacrylate and 104 parts by weight of styrene and the resulting mixture was reacted at 80° C. for 24 hours.

After completion of the reaction, 43 parts by weight of methacrylic acid, 5 parts by weight of hydroquinone and 2 parts by weight of sulfuric acid were added to the resulting polymer, and the resulting mixture was reacted at 150° C. for 48 hours while removing water. After completion of the reaction, 500 parts by weight of dioxane was added to dissolve the reaction product. To this solution was added 500 parts by weight of water to precipitate the polymer. The polymer thus precipitated was vacuum-dried to obtain a solid resin. By an infrared absorption spectrometry, it was confirmed that this copolymer had no alcoholic —OH group.

Hereinafter, this copolymer will be referred to as B-6.

Reference Example 3-(7)

In 1,000 ml of dimethylformamide was dissolved 106 g of 2-methylene-glutaronitrile, and 10 g of tributyltin methoxide was added to the resulting solution, after which the resulting mixture was reacted for 12 hours.

After cooling the reaction product, it was added to dehydrated hexane to precipitate a polymer. The polymer precipitated was further washed with dehydrated hexane and dried to obtain a copolymer having a nitrile group and an α,β-ethylenic double bond adjacent thereto.

Hereinafter, this copolymer will be referred to as B-7.

Reference Example 3-(8)

For 8 hours, 87 g of 2-nitropropylene was reacted with a large excess of bromine water, after which the bromine water was distilled off to obtain 1,2-dibromo-2-nitropropane. A methanolic solution containing 40 g of sodium hydroxide was added to 157 g of said 1,2-dibromo-2-nitropropane and the resulting mixture was reacted at 60° C. for 12 hours to obtain 3-bromo-2-nitropropylene.

Two g of azobisisobutyronitrile was added to a mixture of 72 g of acrylic acid and 116 g of 2-hydroxyethyl acrylate and the resulting mixture was reacted at 80° C. for 8 hours, and then at 130° C. for an additional 12 hours. After pulverizing the resulting polymer, it was added to 150 ml of an aqueous solution containing 40 g of sodium hydroxide and the resulting mixture was reacted 60° C. for 8 hours to obtain an aqueous solution of polymer. After adding 300 ml of acetone to this aqueous solution, 100 g of the 3-bromo-2-nitropropylene synthesized above was added thereto and the resulting mixture was reacted at 60° C. for 8 hours. After completion of the reaction, the acetone and water were distilled off under reduced pressure to obtain a copolymer having a nitrile group and an α,β-ethylenic double bond adjacent thereto.

Hereinafter, this copolymer will be referred to as B-8.

REFERENCE EXAMPLE 4 (PREPARATION OF POLYMERS FOR COMPARISON)

Reference Example 4-(1)

Into a 3-liter separable flask were introduced 1,890 g of toluene, 103 g of methyl methacrylate, 86 g of styrene, 28 g of N-n-propylaminoethylstyrene and 5 g of 2,2'-azobisisobutyronitrile, and the mixture was stirred at 75° C. for 18 hours. The reaction mixture was cooled and poured into 5 liters of n-hexane, upon which a white precipitate was formed. It was collected by filtration and the solid thus obtained was dried. It was a copolymer having the group of structural formula (I) wherein $R_1$ was n-propyl and n was 2.

Hereinafter, this copolymer will be referred to as C-1.

Reference Example 4-(2)

Into a 3-liter separable flask were introduced 1,890 g of toluene, 103 g of methyl methacrylate, 86 g of styrene, 28 g of N-ethylaminoethylstyrene and 5 g of 2,2'-azobisisobutyronitrile, and the mixture was stirred at 75° C. for 18 hours. The reaction mixture was cooled and poured into 5 liters of n-hexane, upon which a white colored precipitate was formed. It was collected by filtration and the solid thus obtained was dried. It was a copolymer having the group of structural formula (I) wherein $R_1$ was ethyl and n was 2.

Hereinafter, this copolymer will be referred to as C-2.

Reference Example 4-(3)

Into a 3-liter separable flask were introduced 1,890 g of toluene, 103 g of methyl methacrylate, 86 g of methyl acrylate, 48 g of t-butylaminoethyl methacrylate and 5 g of 2,2'-azobisisobutyronitrile, and the mixture was stirred at 75° C. for 8 hours. The reaction mixture was cooled and poured into 5 liters of n-hexane, upon which a white precipitate was formed. It was collected by filtration and dried.

Hereinafter, this copolymer will be referred to as C-3.

Reference Example 4-(4)

Into a 3-liter separable flask were introduced 1,890 g of toluene, 103 g of methyl methacrylate, 86 g of methyl acrylate, 58 g of γ-chloropropylstyrene obtained by reacting chloromethylated styrene with ethylene dichloride in methanol by using sodium hydroxide as a catalyst, and 5 g of 2,2'-azobisisobutyronitrile, and the mixture was stirred at 75° C. for 8 hours. The reaction mixture was cooled and poured into 5 liters of n-hexane, upon which a white precipitate was formed. It was collected by filtration, and the solid thus obtained was dried. After dissolving 100 g of this solid (polymer) in 500 g of dioxane, 100 g of isopropylamine was added thereto and the resulting mixture was heated under reflux for 3 days. After completion of the reaction, 1,000 g of water was added to the reaction mixture to precipitate the polymer, and the precipitate was collected by filtration and dried to obtain a solid. By an infrared absorption spectrometry, it was confirmed that this solid (copolymer) had a secondary amino group. It was a copolymer having the group of structural formula (I) wherein $R_1$ was isopropyl and n was 3.

Hereinafter, this copolymer will be referred to as C-4.

EXAMPLE 1

An equal weight mixture of the amino group-containing copolymer of Reference Example 2-(1) to Reference Example 2-(6) and the polymer having a carbonyl group and an ethylenic double bond adjacent thereto of Reference Example 3-(1) to Reference Example 3-(8) was dissolved in ethyl acetate so as to give a solid content of 30% by weight, whereby 48 kinds of solutions were obtained. The solution were placed in polyethylene tanks and subjected to a storage stability test at 50° C.

The number of days until the viscosity of each of the solutions measured with a Brookfield viscometer had reached twice the original values is shown in Table 1. The data clarify that all the solutions are quite excellent in storage stability at 50° C.

TABLE 1

| | Storage Stability (days) | | | | | |
|---|---|---|---|---|---|---|
| | A-1 | A-2 | A-3 | A-4 | A-5 | A-6 |
| B-1 | 70 | 75 | 75 | 40 | 75 | 75 |
| B-2 | 50 | 65 | 60 | 45 | 40 | 55 |
| B-3 | 70 | 70 | 75 | 45 | 65 | 70 |
| B-4 | 45 | 40 | 45 | 45 | 45 | 40 |
| B-5 | 60 | 65 | 65 | 45 | 40 | 50 |
| B-6 | 55 | 55 | 55 | 40 | 55 | 45 |
| B-7 | 50 | 60 | 60 | 45 | 45 | 50 |
| B-8 | 55 | 65 | 60 | 40 | 40 | 55 |

COMPARATIVE EXAMPLE 1

An equal weigh mixture of the amino group-containing copolymer of Reference Example 4-(1) to Reference Example 4-(4) and the polymer having a carbonyl group and an ethylenic double bond adjacent thereto of Reference Example 3-(1) to Reference Example 3-(8) was dissolved in ethyl acetate so as to give a solid content of 30% by weight, whereby 32 combined solutions were obtained. The number of days until the viscosity of each of the solutions at 50° C. had reached twice the original values is shown in Table 2. The data clarify that all the solutions are quite poor in storage stability at 50° C.

TABLE 2

| | Storage Stability (days) | | | |
|---|---|---|---|---|
| | C-1 | C-2 | C-3 | C-4 |
| B-1 | 11 | 14 | 27 | 25 |
| B-2 | 5 | 7 | 20 | 26 |
| B-3 | 15 | 14 | 29 | 30 |
| B-4 | 4 | 3 | 18 | 25 |
| B-5 | 5 | 5 | 17 | 20 |
| B-6 | 4 | 5 | 10 | 11 |
| B-7 | 4 | 7 | 7 | 10 |
| B-8 | 4 | 5 | 5 | 5 |

EXAMPLE 2

Each of the 48 solutions of Example 1 and 30% by weight solutions of polymers B-1 to B-8 in ethyl acetate used as comparisons was cast on a glass plate by means of a bar coater and dried at 25° C. for 3 hours to obtain a dry coating of about 20μ in thickness. The coatings thus obtained were heat-cured at 170° C. for 1 hour in the presence of air.

These cured coatings were extracted with acetone by means of Soxhlet's extractor at 56° C. for 1 hour to obtain the results (gel fraction) shown in Tables 3 and 4. The data clarify that the coatings from the combinations of Example 1 have good film characteristics at high temperatures.

TABLE 3

| | Gel Fraction of Cured Coating (%) | | | | | |
|---|---|---|---|---|---|---|
| | A-1 | A-2 | A-3 | A-4 | A-5 | A-6 |
| B-1 | 90 | 92 | 90 | 90 | 93 | 91 |
| B-2 | 97 | 91 | 95 | 95 | 96 | 95 |
| B-3 | 90 | 90 | 90 | 89 | 91 | 91 |
| B-4 | 99 | 94 | 92 | 98 | 92 | 94 |
| B-5 | 98 | 94 | 93 | 95 | 98 | 92 |
| B-6 | 95 | 92 | 92 | 93 | 86 | 93 |
| B-7 | 90 | 92 | 92 | 91 | 90 | 93 |
| B-8 | 90 | 90 | 91 | 91 | 92 | 90 |

TABLE 4

| | | Gel Fraction of Cured Coating (%) | | | | | |
|---|---|---|---|---|---|---|---|
| B-1 | B-2 | B-3 | B-4 | B-5 | B-6 | B-7 | B-8 |
| 52 | 53 | 48 | 43 | 41 | 42 | 40 | 42 |

$$\text{Gel fraction (\%)} = \frac{\text{Film weight after Soxhlet extraction}}{\text{Film weight before Soxhlet extraction}} \times 100$$

EXAMPLE 3

A mixture consisting of 60 parts by weight of one of the amino group-containing copolymers of Reference Examples 2-(1) to 2-(6) and Reference Examples 4-(1) to 4-(4) and 40 parts by weight of one of the polymers having a carbonyl group and an ethylenic double bond adjacent thereto of Reference Examples 3-(1) to 3-(8) was dissolved in ethylene glycol monobutyl ether so as to give a solid content of 70%, whereby 80 kinds of solutions were obtained. To 100 parts by weight of these solutions was added 1 part by weight of lactic acid, and then 150 parts by weight of deionized water was slowly added at room temperature, whereby aqueous dispersions were obtained. The aqueous dispersions were placed in polyethylene tanks and tightly stoppered, and they were allowed to stand at 60° C. for 60 days in a thermostatic chamber equipped with a shaking means, after which 50 g of each aqueous dispersion was weighed accurately, vacuum-dried at 100° C. for 3 hours, and dissolved in acetone. The insoluble matter was collected by filtration by means of a glass filter (No. 5, particle diameter 2–5 μm). The forming rate of microgel was calculated from the ratio of the weight of acetone-insoluble substance (microgel) to the weight of aqueous dispersion, based on which the storage stability was evaluated. The results are shown in Table 5.

TABLE 5

| | Forming Rate of Microgel (Storage Stability) (%) | | | | | | | |
|---|---|---|---|---|---|---|---|---|
| | B-1 | B-2 | B-3 | B-4 | B-5 | B-6 | B-7 | B-8 |
| A-1 | 0 | 0.1 | 0 | 0 | 0 | 0 | 0 | 0 |
| A-2 | 0 | 0.1 | 0 | 0 | 0 | 0 | 0 | 0 |
| A-3 | 0 | 0 | 0 | 0 | 0 | 0 | 0 | 0 |
| A-4 | 0 | 0.1 | 0 | 0.1 | 0 | 0 | 0 | 0 |
| A-5 | 0 | 0 | 0 | 0 | 0 | 0 | 0 | 0 |
| A-6 | 0 | 0 | 0 | 0 | 0 | 0 | 0 | 0 |
| C-1 | 0.3 | 0.5 | 0.3 | 0.6 | 0.5 | 0.5 | 0.3 | 0.5 |
| C-2 | 0.3 | 0.5 | 0.3 | 0.8 | 0.5 | 0.4 | 0.3 | 0.6 |
| C-3 | 0.4 | 0.5 | 0.2 | 0.5 | 0.5 | 0.2 | 0.3 | 0.6 |
| C-4 | 0.2 | 0.2 | 0.3 | 0.7 | 0.4 | 0.3 | 0.3 | 0.5 |

$$\text{Forming rate of microgel (\%)} = \frac{\text{Weight of microgel}}{\text{Weight of resin composition in 50 g of aqueous dispersion}} \times 100$$

EXAMPLE 4

A mixture consisting of 120 parts by weight of the amino group-containing copolymer (A-1) of Reference Example 2-(1) and 80 parts by weight of the polymer having an ethylenic double bond (B-1) of Reference Example 3-(1) was dissolved in ethylene glycol monobutyl ester so as to give a solid content of 80% by weight. Then, 2.5 parts by weight of acetic acid was added thereto and the mixture was thoroughly stirred and homogenized to neutralize the secondary amino group in the composition partially. Subsequently, 1,000 parts by weight of deionized water was slowly added at room temperature to obtain an aqueous dispersion.

The aqueous dispersion thus obtained was placed in a 2-liter beaker, a zinc phosphate-treated steel plate manufactured by Nippon Test Piece K.K. (150 m/m × 70 m/m × 0.8 m/m) was introduced thereinto, a stainless steel plate was introduced as an anode, and a direct current was passed at an interpolar voltage of 250 V.

During the passing of electric current, the electrolytic solution was kept stirred with a magnetic stirrer and its temperature was in the range of 28°–30° C. Thereafter, the steel plate of test piece thus coated was thoroughly washed with water, air-dried and then baked and cured at 175° C. for 25 minutes by means of an oven with internal air circulation.

The coating thus obtained was flat, smooth and glossy. When it was vigorously rubbed with defatted cotton wetted with acetone, changes such as dissolution of the coating, reduction of gloss, occurrence of mark by rubbing, and the like were not found at all. The properties of the aqueous dispersion and the results of the measurement of coating properties were as follows:

(1) Properties of aqueous dispersion
  pH: 6.8
  Specific conductivity: 1,360 μυ/cm (25° C.)
(2) Coating properties
  Film thickness: 15–20μ
  Pencil hardness: 3H Impact value (Du Pont) (1 kg, ½ inch φ): 50 cm OK
Acid resistance (0.2 N sulfuric acid, 20° C.×48 hrs.): No change
Salt spray test (JIS K-5400): Good (no blister)

EXAMPLE 5

A mixture consisting of 100 parts by weight of the amino group-containing copolymer (A-1) of Reference Example 2-(1) and 100 parts by weight of the polymer having ethylenic double bond (B-3) of Reference Example 3-(3) was dissolved in ethylene glycol monobutyl ether so as to give a solid content of 80% by weight. After neutralizing the solution with 2 parts by weight of acetic acid to an extent of about 60% based on the theoretical degreee of neutralization and thoroughly stirring and homogenizing it, 1,000 parts by weight of deionized water was slowly added at room temperature to obtain an aqueous dispersion. Hereinafter, this aqueous dispersion will be referred to as D-1. Another aqueous dispersion was also prepared by repeating the procedure mentioned above, expect that the acetic acid was added in an amount of 5 parts by weight (100% or more based on the theoretical degree of neutralization). Hereinafter, this aqueous dispersion will be referred to as D-2.

On the aqueous dispersions D-1 and D-2 thus obtained, the properties of aqueous dispersion and the properties of electrodeposited coating were measured. The results are shown in Table 6.

Further, zinc plated steel pipe for service water (JIS G-3442) was dipped in aqueous dispersions D-1 and D-2 and allowed to stand at 50° C. for 30 days to investigate corrosion of the steel pipe based on decrease in weight. The results are shown in Table 6.

TABLE 6

| | Item | | D-1 | D-2 |
|---|---|---|---|---|
| Properties | pH | | 7.0 | 6.1 |
| of aqueous | Specific conductivity (25° C.) | μυ/cm | 1,250 | 1,650 |
| dispersion | Corrosion test (decrease in weight) | % | 0.5 | 1.8 |
| | Dispersion stability (allowing to stand at 50° C.) | | No precipitate | No precipitate |
| Electro-coating characteristics | Coulomb efficiency | mg/coulomb | 35 | 25 |
| | Throwing power (Ford pipe method) | cm | 25 | 19 |
| Properties of coating | Film thickness | | 20 | 18 |
| | Pencil hardness | | 3H | 3H |
| | Du Pont impact value (1 kg load, ½ in, φ) | cm | 50 or more | 50 or more |

What is claimed is:

1. A resin composition comprising (A) a polymer comprising units of the structural formula (I):

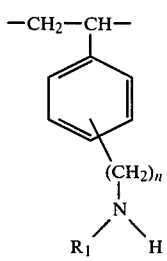

wherein $R_1$ represents a group selected from the class consisting of isopropyl, sec-butyl, t-butyl, a $C_{5-20}$ alkyl group, a $C_{3-20}$ cycloalkyl group, a $C_{5-20}$ alkenyl group, a $C_{3-20}$ hydroxyalkyl group, a $C_{5-20}$ alkoxyalkyl group, a $C_{3-20}$ aminoalkyl group, a $C_{6-20}$ aryl group and a $C_{6-20}$ arylalkyl group, and n represents 0, 1 or 2, and (B) a polymer having an electron attractive group and an α,β-ethylenic double bond adjacent to said electron attractive group, said composition being stable at room temperature but being crosslinkable and curable at high temperatures by the Michael addition reaction.

2. A resin composition according to claim 1, wherein said polymer (A) is a polymer obtained by homopolymerizing a monomer represented by the structural formula (II):

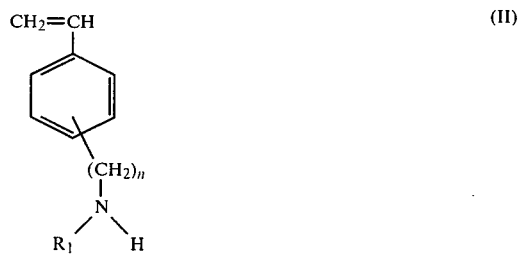

wherein $R_1$ represents a group selected from the class consisting of isopropyl, sec-butyl, tert-butyl, a $C_{5-20}$ alkyl group, a $C_{3-20}$ cycloalkyl group, a $C_{5-20}$ alkenyl group, a $C_{3-20}$ hydroxyalkyl group, a $C_{5-20}$ alkoxyalkyl group, a $C_{3-20}$ aminoalkyl group, a $C_{6-20}$ aryl group and a $C_{6-20}$ arylalkyl group, and n represents 0, 1 or 2, or by copolymerizing said monomer with at least one other vinyl monomer.

3. A resin composition according to claim 2, wherein the vinyl monomer of the formula (II) is N-isopropylaminoethylstyrene, N-sec-butylaminoethylstyrene, N-tert-butylaminoethylstyrene, N-pentylaminoethylstyrene, N-hexylaminoethylstyrene, N-decylaminoethylstyrene, N-dodecylaminoethylstyrene, N-cyclohexylaminoethylstyrene, N-phenylaminoethylstyrene, N-benzylaminoethylstyrene, N-hydroxyisopropylaminoethylstyrene, N-methoxyhexylaminoethylstyrene, N-ethoxyisopropylaminoethylstyrene, N-aminoisopropylaminoethylstyrene, N-aminoisopropylaminoethylstyrene, N-isopropylaminostyrene, N-t-butylaminostyrene, N-isopropylaminomethylstyrene, N-t-butylaminomethylstyrene, N-pentylaminomethylstyrene, N-hydroxyisopropylaminomethylstyrene or N-aminobutylaminomethylstyrene.

4. A resin composition according to claim 2, wherein the vinyl monomer of the formula (II) is N-isopropylaminoethylstyrene, N-sec-butylaminoethylstyrene, N-tert-butylaminoethylstyrene or N-cyclohexylaminoethylstyrene.

5. A resin composition according to claim 3, wherein said other vinyl monomer is selected from the group consisting of unsaturated carboxylic acids, acrylic esters, methacrylic esters, α-chloroacrylic esters, α-acyloxyacrylic esters, α-alkoxyacrylic esters, and itaconic esters.

6. A resin composition according to claim 5, wherein the unsaturated carboxylic acids are acrylic, methacrylic, α-chloroacrylic, α-acyloxyacrylic, α-alkoxyacrylic and itaconic acids; the acrylic esters are methyl, ethyl, butyl, octyl, octadecyl, cyclohexyl, trimethylcyclohexyl, phenyl, amylphenyl, chloroethyl, dichloropropyl, bromopropyl, hydroxyethyl, bishydroxymethylpentyl, methoxyethyl, ethoxypropyl, glycidyl and tetrahydrofurfuryl acrylates; the methacrylic esters are ethyl, butyl, octyl, decyl, dodecyl, stearyl, cyclohexyl, phenyl, butylphenyl, naphthyl, benzyl, triphenylmethyl, chloromethyl, fluoroethyl, bromoethyl, chlorocyclohexyl, chlorophenyl, tribromophenyl, hydroxyethyl, hydroxypropyl, ethoxyethyl, methoxybutyl, glycidyl and tetrahydrofurfuryl methacrylates; the α-chloroacrylic esters are methyl, butyl, and ethoxyethyl α-chloroacrylates; the α-acyloxyacrylic esters are ethyl α-acetoxyacrylate and ethyl α-benzoyloxyacrylate; the itaconic esters are dimethyl, dibutyl, chloroethyl, and hydroxyethyl itaconates; and the α-alkoxyacrylic esters are cyclohexyl α-ethoxyacrylate.

7. A resin composition according to claim 3, wherein said other vinyl monomer is acrylic acid; methyl, butyl or 2-ethylhexyl acrylate; methacrylic acid; or methyl, butyl, 2-ethylhexyl, dimethylaminoethyl or tetrahydrofurfuryl methacrylate.

8. A resin composition according to claim 1, wherein the polymer (A) is a copolymer of methyl methacrylate, ethyl acrylate and tert-butylaminoethylstyrene, a copolymer of methyl acrylate, methyl methacrylate, and cyclohexylaminoethylstyrene or a copolymer of methyl methacrylate, methyl acrylate, 2-hydroxyethyl acrylate and N-isopropylaminoethylstyrene.

9. A resin composition according to claim 2, wherein the polymer (A) is a polymer obtained by reacting a primary amine represented by the formula (IV), $$R_1-NH_2 \qquad (IV)$$

wherein $R_1$ and n are as defined in claim 2, with a copolymer of a monomer represented by the formula (III),

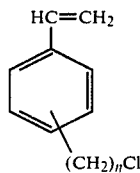

wherein n is 0, 1 or 2, or a copolymer of said monomer (III) with other vinyl monomer.

10. A resin composition according to claim 2, wherein $R_1$ has 3 to 8 carbon atoms and is bonded to the nitrogen atom through a secondary or tertiary carbon atom.

11. A resin composition according to claim 10, wherein n is 1 or 2.

12. A resin composition according to claim 10, wherein said other vinyl monomer is at least one member selected from the group consisting of styrene, styrene derivatives, acrylic acid, acrylic esters, methacrylic acid, and methacrylic esters.

13. A resin composition according to claim 1, wherein the electron attractive group in the polymer (B) is carbonyl group.

14. A resin composition according to claim 13, wherein the polymer (B) is a polymer obtained by a reaction between a polymer having 2 or more epoxy groups in the molecule and an unsaturated carboxylic acid having an α,β-ethylenic double bond.

15. A resin composition according to claim 1, wherein the equivalent ratio of the group represented by the structural formula (I) to the α,β-ethylenic double bond adjacent to the electron attractive group of the polymer (B) is 100:1 to 1:100.

16. A resin composition according to claim 1, wherein the equivalent ratio of the group represented by the structural formula (I) to the α,β-ethylenic double bond adjacent to the electron attractive group of the polymer (B) is 50:1 to 1:50.

17. A resin composition according to claim 1, wherein the polymer (A) and/or the polymer (B) has an alcoholic OH group in the molecule.

18. A coating material comprising the resin composition according to any one of claims 1-17.

19. A coating material according to claim 18, wherein the resin composition is dispersed in water.

20. A coating material according to claim 19, in which the dispersion contains an acid.

21. A coating material according to claim 20 which is in the form of a cathodic electrocoating material.

22. A coating material according to claim 20, wherein the pH value of the dispersion is 6.5-7.5.

* * * * *